US006079092A

United States Patent [19]

Bannerman

[11] Patent Number: 6,079,092

[45] Date of Patent: Jun. 27, 2000

[54] DEVICE FOR POSITIONING AN OBJECT RELATIVE TO AN OPENING

[76] Inventor: Glenn S. Bannerman, 1082 N. Capitol Ave., San Jose, Calif. 95133

[21] Appl. No.: 09/172,724

[22] Filed: Oct. 13, 1998

[51] Int. Cl.$^7$ ...... B23P 19/04

[52] U.S. Cl. ...... 29/252

[58] Field of Search ...... 29/252, 263, 251, 29/280, 282, 426.5

[56] References Cited

U.S. PATENT DOCUMENTS

| | | | |
|---|---|---|---|
| 1,465,124 | 8/1923 | Gardner | 29/263 |
| 3,555,649 | 1/1971 | Rigot et al. | 29/252 |
| 4,077,102 | 3/1978 | Smith | 29/252 |
| 4,967,460 | 11/1990 | Runyan et al. . | |
| 5,224,255 | 7/1993 | Gracey . | |
| 5,249,342 | 10/1993 | Smith . | |
| 5,317,793 | 6/1994 | Boyd et al. . | |
| 5,363,543 | 11/1994 | Boyd et al. . | |
| 5,402,560 | 4/1995 | Rode . | |
| 5,404,631 | 4/1995 | Boyd et al. . | |
| 5,410,793 | 5/1995 | VanBibber . | |

*Primary Examiner*—Robert C. Watson
*Attorney, Agent, or Firm*—Theodore J. Bielen, Jr.

[57] ABSTRACT

A device for manipulating an object having an opening or bore which is held relative to the opening. The device includes an element which extends through the bore in the object and includes a first portion for bearing on the object and a second portion projecting outwardly from the object. A puller exerts a force on the element, and is found in a stationary housing. A spanner bridges the stationary housing and the body containing the object, permitting the puller and connected element to move the object relative to the body.

8 Claims, 2 Drawing Sheets

DEVICE FOR POSITIONING AN OBJECT RELATIVE TO AN OPENING

BACKGROUND OF THE INVENTION

The present invention relates to a novel device for positioning an object relative to an opening in a body.

Many machines and engines employ bored objects which are fictionally fitted within openings in the machine or object. For example, valve guides, seats, bearings, bushings and the like reside in this class of objects which are located via an interference fit. In many cases, the worn or failed fictionally fitted objects must be removed and new ones installed to assure the operation of an engine, machine, and the like.

In the past, other devices have been utilized in which a member is inserted through the fitted object and removed by the use of flanges which extend from the pulling member. For example, U.S. Pat. Nos. 5,224,255 and 5,249,342 describe such removing structures.

U.S. Pat. No. 4,967,460 employs a blind hole bushing remover in which pushing media in the form of grease is introduced under pressure to effect removal of the bushing or bearing.

U.S. Pat. No. 5,410,793 describes a tool for removing spindle bearings that employs a nut and a threaded rod which provides a force by the turning of the threaded rod on the object to be removed.

U.S. Pat. No. 5,402,560 which uses a piston to push an inner bearing race which collapses a spacer to provide proper bearing tension within a spindle or axle.

U.S. Pat. Nos. 5,317,793, 5,363,543, and 5,404,631 describes an apparatus which is used either to extract or to install bushings concentrically in a bore. The device uses a puller which is guided by a bushing 64 mounted on a U-shaped member. The guide mechanism of the tool is used to ensure close alignment with the axis of the bushing to be removed and the axis of pull. Various guides must be employed with the tool to accommodate different size bushings which are to be removed or inserted.

A device for manipulating an object having a bore fictionally held in an opening of a body which is portable and versatile in various situations, would be a notable advance in the machine maintenance and repair field.

SUMMARY OF THE INVENTION

In accordance with the present invention a novel and useful device for positioning an object relative to a body is herein provided.

The device of the present invention utilizes an element which extends through the bore of the object. The element includes a first portion for bearing on the object and a second portion projecting outwardly from the object. The first portion of the element bearing on the object may be removable and interchangeable to accommodate objects of various sizes and having various openings. The element may take the form of an elongated member such as a bolt, rod, shaft, and the like.

Pulling means is also employed in the present invention for exerting a pulling force on the object by way of the first portion of the element. Such pulling means may take the form of a hydraulic piston which exerts a pulling force. A housing is placed over the pulling member of the pulling means such that the pulling member moves relative to the stationary housing. A spanner is also employed in the present invention and is connected or fixed to the stationary housing of the pulling means, and engages the body containing the object to be inserted or removed. The spanner may also include a bowl or other open cavity member which would surround the object located in the opening of the body. Means is also provided for connecting the element to the pulling member such that the pulling member lies essentially within the spanner, but is free from contact therewithin. Thus, the device of the present invention may employ pulling members of various sizes and shapes and permits the manipulation of the device of the present invention either axially relative to the object being held in the body or at various angles thereto.

It may be apparent that a novel and useful device for manipulating an object relative to an opening in a body which is versatile and may be employed to remove or insert such object in the body.

Another object of the present invention is to provide a device for manipulating an object which is friction fitted within an opening in a body and which may be employed in various environments such as machines, engines, and the like.

Yet another object of the present invention is to provide a device for manipulating an object held within an opening in a body that is portable and may be easily adapted for removing or inserting such objects possessing various sizes and shapes.

A further object of the present invention is to provide a device for manipulating an object held to an opening in a body that uses a conventional hydraulic piston which has been adapted for use with the device of the present invention.

The invention possesses other objects and advantages especially as concerns particular characteristics and features thereof which will become apparent as the specification continues.

For a better understanding of the invention references made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be referenced to the prior described drawings.

Figure 1:
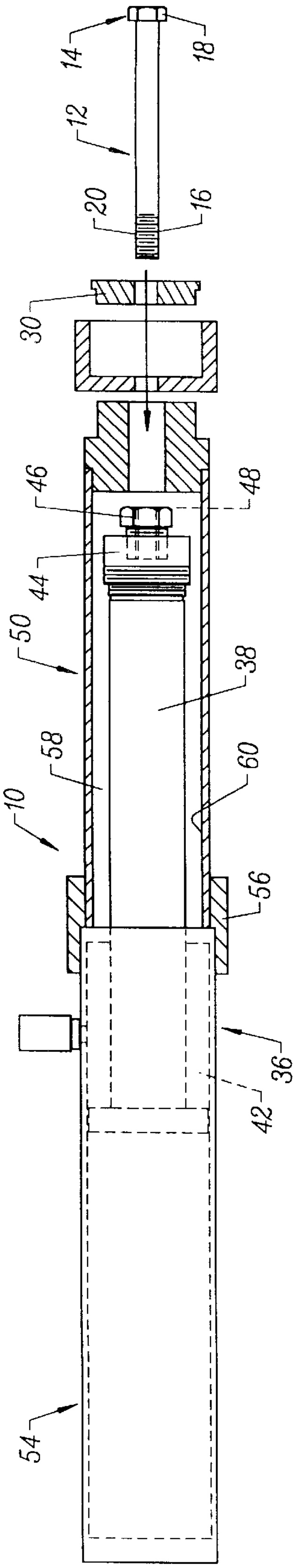
FIG. 1 is a axial view showing the device of the present invention in exploded configuration.
Figure 2:
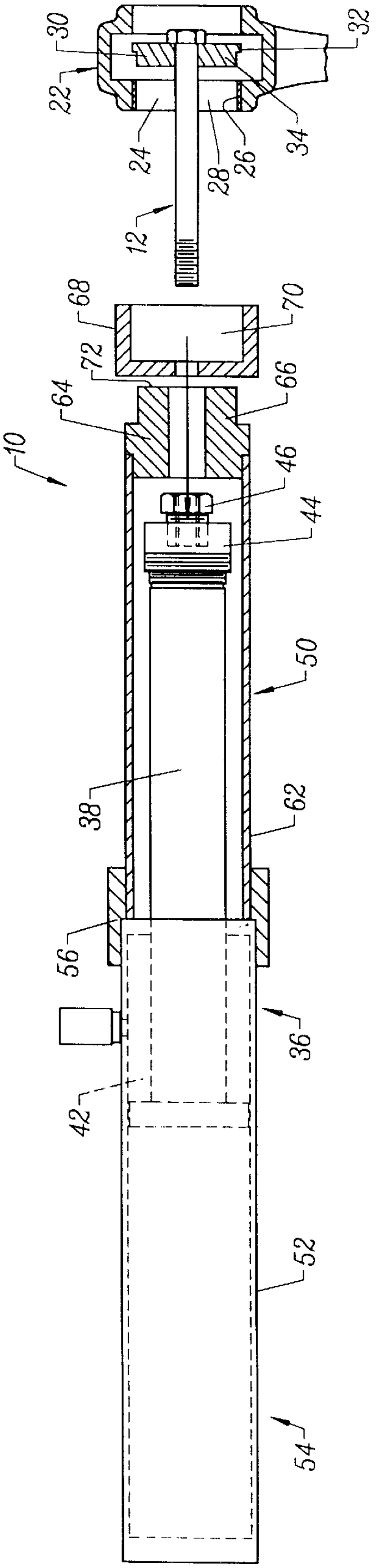
FIG. 2 is a axial view of the device of the present invention depicting positioning of the same relative to a bushing to be removed from a body.

The invention as a whole is depicted in the drawings by reference character 10. Device 10 includes as one of its main parts, an element 12 which includes a first portion 14 and a second portion 16. As may be observed from FIG. 1, first portion 14 includes an enlarged head 18 while second portion 16 of element 12 includes a threaded surface 20. The function and purpose of these elements will be discussed hereinafter. With reference to FIG. 2, it may be observed that device 10 is used in conjunction with a body 22 having an opening 24 therethrough. Object 26, such as a bushing, is fitted within opening 24 and also includes a bore 28 therethrough. Object 26 is friction or press fitted within opening 24 of body 12. In certain cases, device 10 may be used to emplace object 26 within opening 24 or, conversely, to remove object 26 from opening 24 of body 22. The following drawings illustrate one aspect of the invention in which object 26 is being removed from opening 24 and body 22. In this regard, element 12 first portion 14 includes a sleeve 30 possessing a flange 32 which bears on object 26. In turn, enlarged head 18 of first portion 14 of element 12 bears on surface 34 of sleeve 30. FIG. 2 illustrates such a relationship between element 12, enlarged head 18, and sleeve 30.

With respect to FIGS. 1–4, pulling means 36 is also illustrated. Pulling means may take the form of a hydraulically activated piston or pulling member 38 which is moved from right to left in the drawings by the application of hydraulic fluid through inlet 40 and into hydraulic cylinder chamber 42. Hydraulic piston or pulling member 38 includes an end 44 fashioned with a fitting or insert 46. Fitting 46 threads into end 44 of hydraulic piston or pulling member 38 and provides a threaded surface 48 for threadingly engaging threaded surface 20 of second portion 16 of element 12. Such threading engagement is depicted most clearly in FIGS. 3 and 4. Pulling means 36 also includes a housing or spanner 50 which is fastened to the external surface 52 of hydraulic cylinder housing 54 forming chamber 42. Collar 56 is depicted as achieving such connecting function between spanner 50 and hydraulic cylinder housing 54. Collar 56 may be threaded, glued, used in conjunction with fasteners, and the like to effect the interconnection between hydraulic cylinder housing 54 and spanner 50. In any case, spanner 50 is stationary relative to piston or pulling member 38, which travels within chamber 58 of spanner 50. It should be noted, that piston 38 is spaced from the internal surface 60 of spanner 50.

Spanner 50 includes a first portion 62 fixed to stationary hydraulic cylinder housing 54 by collar 56. In addition, second portion 64 of spanner 50 terminates in a bushing 66 and an end portion 68 having an open cavity 70. In certain cases, end portion 68 is not necessary for the function of the present invention. That is to say, bushing 66 of spanner 50 may bear directly on body 22 at end surface 72.

Figure 3:
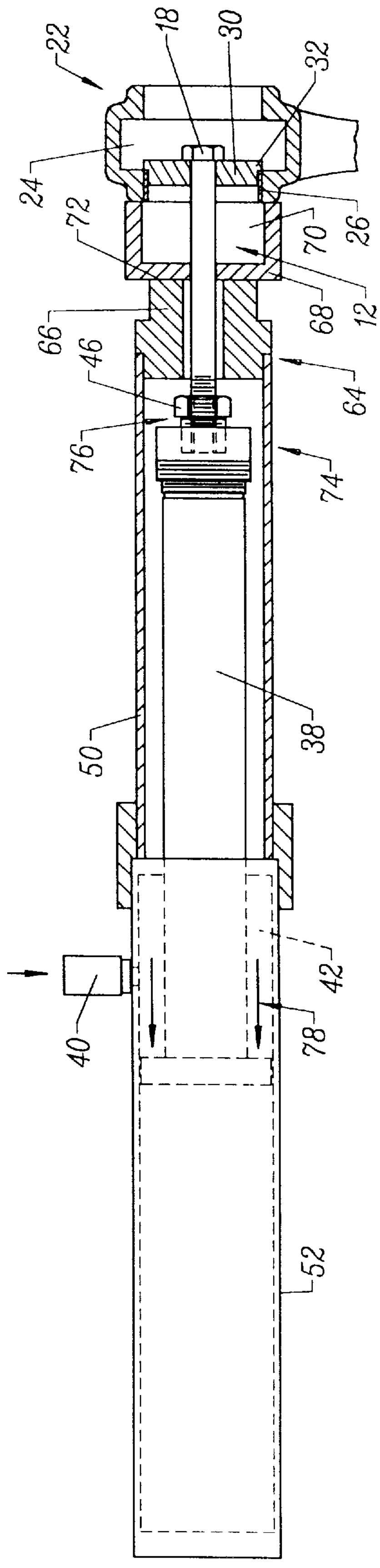
FIG. 3 is an axial view of a device of the present invention in operation, according to FIG. 2, where pulling pressure has been applied.
Figure 4:
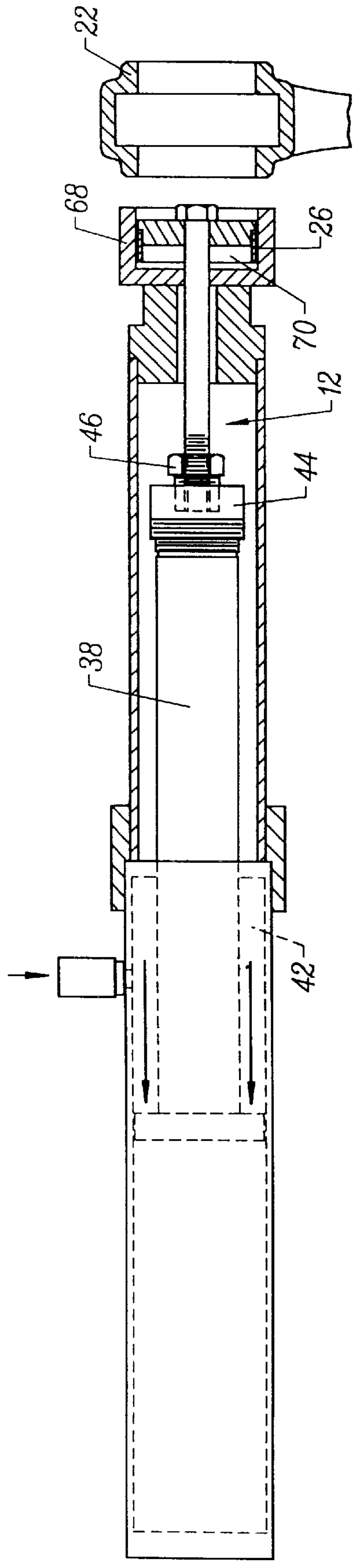
FIG. 4 is an axial view of the device of the present invention in which the object has been removed from the body after force has been applied according to the rendition in FIG. 3.

In operation, best shown in FIGS. 3 and 4, element 12 is passed through opening 24 in object 22 such that sleeve 30 held by enlarged head 18 of element 12 bears on object 26. Specifically, flange 32 of sleeve 30 is depicted as contacting object 26. Means 74 is employed for connecting element 12 to piston or pulling member 38. Such connecting means 74 is accomplished by threaded mechanism 76 which includes fitting 46 threadingly engaging end 44 of piston 38 and providing a threaded surface for threaded end 20 of second portion 16 of element 12. Second part 64 of spanner 50 then bears on object 22. In the embodiment depicted in the drawings, second part 64 of spanner 50 includes end portion 68 having an open cavity 70 to form a bowl-like member. In certain cases, end surface 72 of bushing 66 may bear on directly object 22 without the benefit of end portion 68. Hydraulic fluid is then forced into inlet 40 and into hydraulic cylinder chamber 42. Piston 38 is then retraced according to directional arrows 78 causing piston 38 to move accordingly. Such movement of piston 38 forces object 26 from body 22 and, in the case depicted in FIGS. 3 and 4, to the confines of cavity 70 of end portion 68. It should be noted that the dimensions of end portion 68, if used, as well as the dimensions of sleeve 30 and enlarged head 18 of element 12 may be varied according to the size of object 26 being inserted or removed in body 22.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for manipulating an object having a bore, held relative to an opening in a body, comprising;

a. an element, said element extending through the bore in the object, said element including a first portion for bearing on the object and a second portion projecting outwardly from the object;

b. pulling means for exerting a pulling force, said pulling means including a pulling member and a housing, said housing being stationary relative to said pulling member and contacting the body;

c. a spanner, said spanner including a first part fixed to said stationary housing of said pulling member and a second part containing the object, said spanner second part including an end portion possessing a cavity for at least partially encompassing the object, said spanner second part being separable from said spanner first part, said spanner second part cavity further including an opening for passage of said element; and d. means for connecting said element to said pulling member, said pulling member essentially spaced from said spanner first and second parts, to allow relative movement of said element thereto.

2. The device of claim 1 in which said spanner comprises a first part connected to said stationary housing of said pulling means and a second part contacting said first part of said spanner and said body.

3. The device of claim 2 in which said spanner second part includes an end portion possessing a cavity for at least partially encompassing the object being manipulated.

4. The device of claim 1 in which said means for connecting said element to said pulling member comprises a threaded mechanism between said pulling member and said element.

5. The device of claim 4 in which said threaded mechanism includes an insert attached to said pulling member, said insert including a threaded surface, and a threaded surface at said element, said threaded surface at said element threadingly engaging said threaded surface of said insert.

6. The device of claim 1 in which said element first portion comprises a sleeve having a flange for bearing on the object and a separate surface for contacting said sleeve.

7. The device of claim 6 in which said means for connecting said element to said pulling member comprises a threaded mechanism between said pulling member and said element.

8. The device of claim 7 in which said threaded mechanism includes an insert attached to said pulling member, said insert including a threaded surface, and a threaded surface at said element, said threaded surface at said element threadingly engaging said threaded surface of said insert.

* * * * *